US009042269B2

(12) United States Patent
Rickman (10) Patent No.: US 9,042,269 B2
(45) Date of Patent: May 26, 2015

(54) PROVISIONING NETWORK DEVICES TO PROVIDE A NETWORK SERVICE

(71) Applicant: VERIZON PATENT AND LICENSING, INC., Basking Ridge, NJ (US)

(72) Inventor: Jeff Rickman, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

(21) Appl. No.: 13/719,629

(22) Filed: Dec. 19, 2012

(65) Prior Publication Data

US 2014/0169213 A1     Jun. 19, 2014

(51) Int. Cl.
*H04L 12/28*      (2006.01)
*H04L 12/24*      (2006.01)

(52) U.S. Cl.
CPC .................................. *H04L 41/0806* (2013.01)

(58) Field of Classification Search
CPC .................................................. H04L 41/0806
USPC ........................................................... 370/254
See application file for complete search history.

(56) References Cited

U.S. PATENT DOCUMENTS

2012/0054785 A1\*   3/2012   Yang et al. ........................ 725/16
2014/0059142 A1\*   2/2014   Gandhi et al. ................. 709/206

\* cited by examiner

*Primary Examiner* — Shripal Khajuria (57) ABSTRACT

A device is configured to receive information that identifies a type of network service to be provided to a customer, determine, based on the type of network service, network devices to provide the network service, where the network devices may include a first network device and a second network device. The device is configured to generate, for each of the network devices, corresponding configuration code for configuring the network devices to provide the network service, where first configuration code corresponding to the first network device may be different from second configuration code corresponding to the second network device. The device is configured to transmit, to each network device, the corresponding configuration code to configure the network devices to provide the network service.

20 Claims, 9 Drawing Sheets

PROVISIONING NETWORK DEVICES TO PROVIDE A NETWORK SERVICE

BACKGROUND

A network service provider may provide custom services for customers, such as a custom-built private network with particular capabilities specified by the customer. The network service provider may provision and configure network devices, such as servers, routers, gateways, etc., to provide the custom service.

DETAILED DESCRIPTION OF PREFERRED EMBODIMENTS

The following detailed description of example implementations refers to the accompanying drawings. The same reference numbers in different drawings may identify the same or similar elements.

A network service provider may provide custom services for customers, such as a custom-built private network with particular capabilities specified by the customer. The network service provider may provision and configure network devices to provide the custom service, such as servers, routers, gateways, etc. Manual configuration of network devices may be expensive, inconsistent, and slow. Implementations described herein may provide automatic configuration of network devices to provide custom services to a customer.

Figure 1:
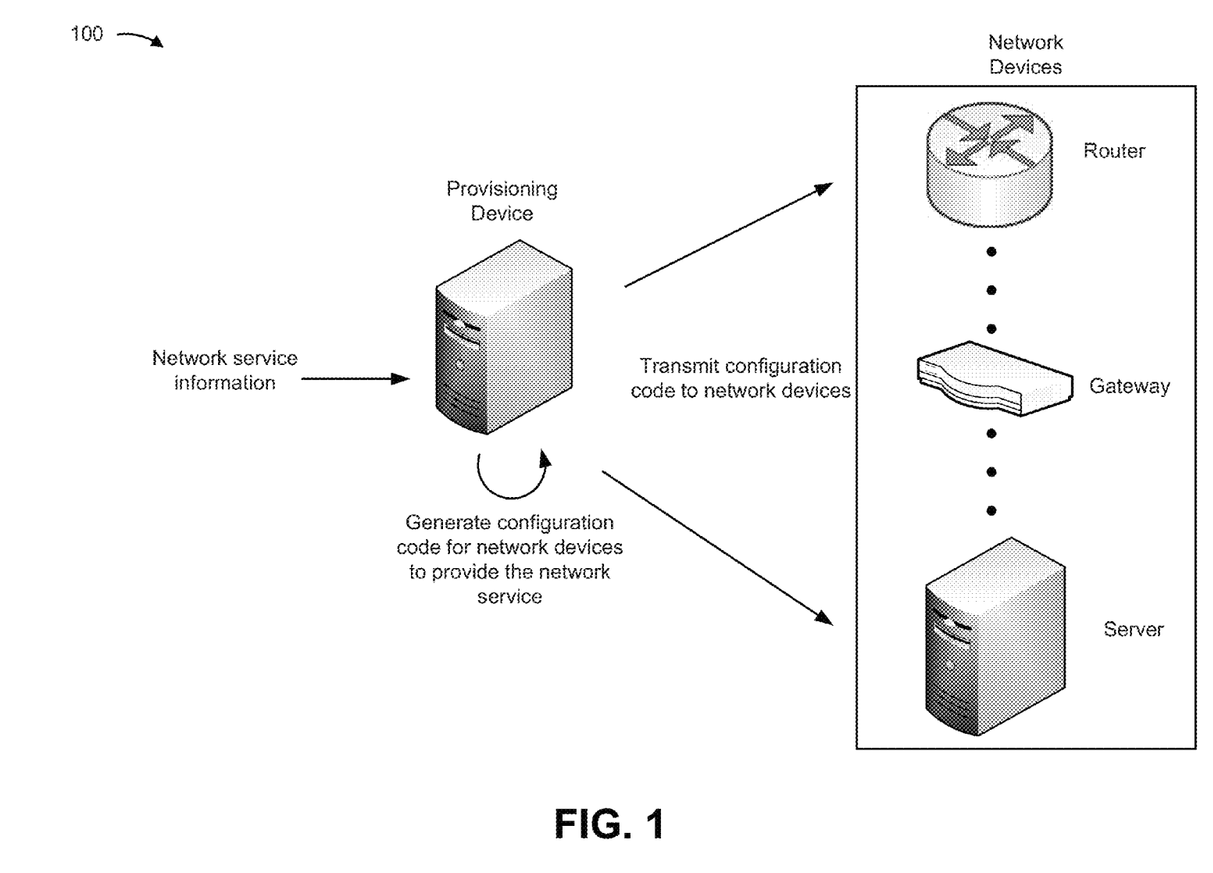
FIG. 1 is a diagram of an overview of an example implementation described herein.

FIG. 1 is a diagram of an overview of an example implementation 100 described herein. As shown in FIG. 1, implementation 100 may include a provisioning device, such as a server, and one or more network devices, such as a router, a gateway, a server, etc.

As shown in FIG. 1, the provisioning device may receive information associated with a network service to be provided to a customer. For example, the network service may include a private network to be set up, by a network service provider, for a customer. The received information may identify customer devices that may utilize the network service, requirements of the network service (e.g., bandwidth, jitter, packet delay, or other requirements), etc. Based on the received information, the provisioning device may identify network devices to provide the network service, and may generate configuration code to provision the network devices to provide the network service. As further shown, the provisioning device may transmit the configuration code to the network devices, and the configuration code may configure the network devices to provide the network service.

Figure 2:
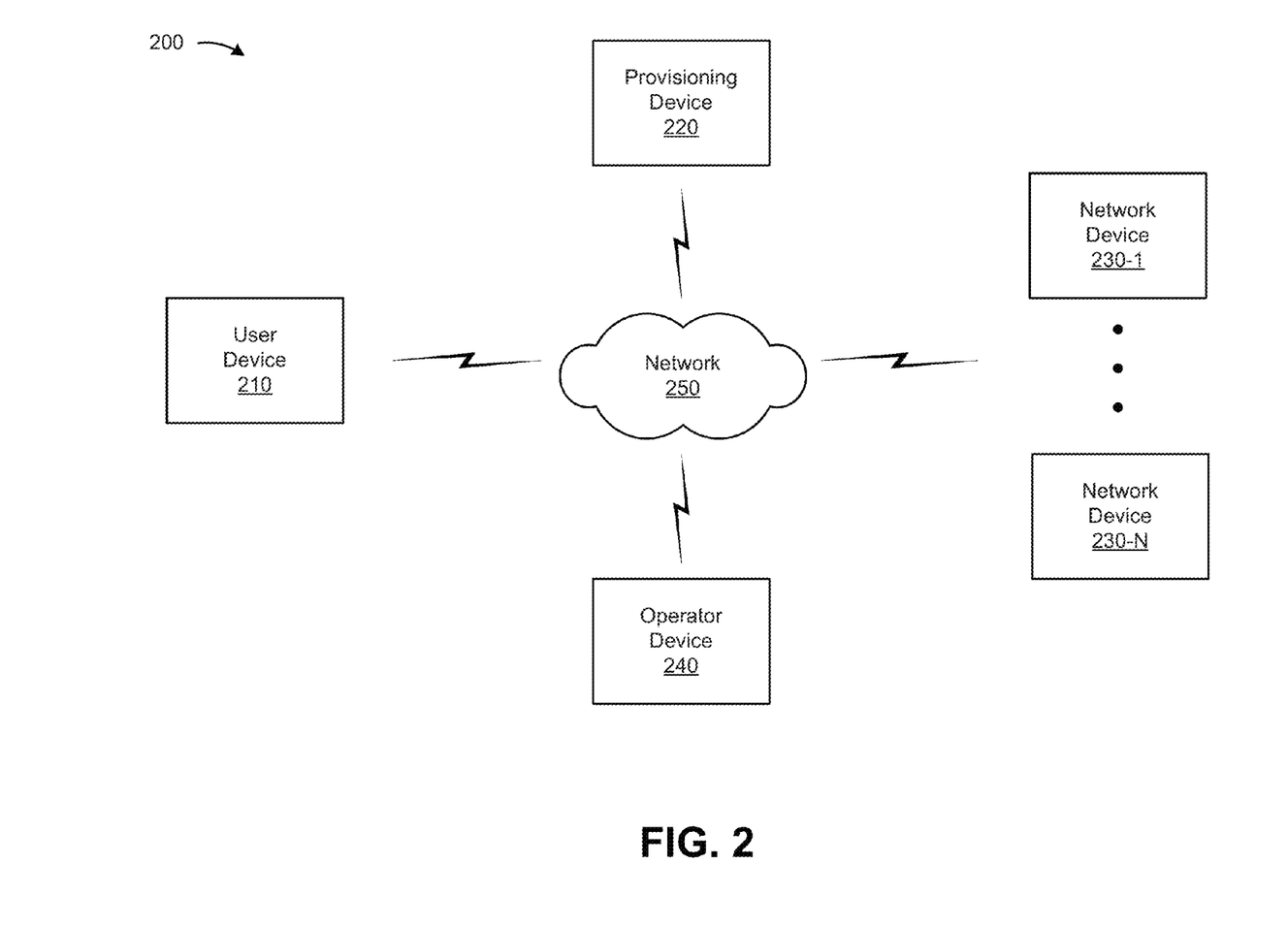
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a provisioning device 220, network devices 230-1 through 230-N (N≥1) (hereinafter referred to collectively as "network devices 230," and individually as "network device 230"), operator device 240, and network 250.

User device 210 may include a device capable of communicating with provisioning device 220. For example, user device 210 may include a computing device (e.g., a desktop computer, a laptop computer, a tablet computer, a handheld computer, a smart phone, a radiotelephone, etc.) or a similar device. In some implementations, user device 210 may receive input from a user, such as information associated with a network service requested by the user, and may provide the input to provisioning device 220.

Provisioning device 220 may include one or more server devices, or similar devices. In some implementations, provisioning device 220 may receive information associated with a network service requested by the user (e.g., network service information), may generate configuration code based on the network service information, and may transmit the configuration code (e.g., to network devices 230 that are to provide the network service). Additionally, or alternatively, provisioning device 220 may receive and/or retrieve additional information associated with the network service (e.g., from user device 210, from a data structure, from network devices 230, from another device, etc.), and may generate the configuration code based on the additional information.

Network device 230 may include one or more devices capable of providing network services. For example, network device 230 may include a traffic transfer device (e.g., a router, a switch (e.g., an Ethernet switch), a firewall, a hub, a gateway, a bridge, a modem, a network interface card, a base station, an optical add-drop multiplexer, a reconfigurable optical add-drop multiplexer, an optical transmitter, an optical receiver, an optical transceiver etc.), a server (e.g., a virtual server, a proxy server, etc.), and/or another device capable of transmitting, receiving, transferring, and/or processing network traffic.

Additionally, or alternatively, network device 230 may include one or more devices that are part of a packet-switched network, a circuit-switched network, a third generation (3G) network, an internet protocol multimedia subsystem (IMS) core, and/or a long term evolution (LTE) network, such as a serving gateway (SGW), a packet data network (PDN) gateway (PGW), a mobility management entity (MME) device, a home subscriber server (HSS), a home agent (HA), a foreign agent (FA), a packet data serving node (PDSN), etc. Additionally, or alternatively, network device 230 may include one or more devices of a multiprotocol label switching network. In some implementations, network device 230 may receive configuration code from provisioning device 220, and may configure network device 230 using the configuration code.

Operator device 240 may include a device capable of communicating with provisioning device 220. For example, operator device 240 may include a computing device (e.g., a desktop computer, a laptop computer, a tablet computer, a handheld computer, a smart phone, a radiotelephone, a server, etc.) or a similar device. In some implementations, operator device 240 may receive information from provisioning device 220, and a user of operator device 240 may input information that indicates approval or modification of the information. Operator device 240 may transmit the information to provisioning device 240. Additionally, or alternatively, operator device 240 may receive information associated with network devices 230 that have been configured and/or provisioned, such as monitoring information. Operator device 240 may display the monitoring information on a display.

Network 250 may include one or more wired and/or wireless networks. For example, network 250 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 250 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices shown in FIG. 2 is provided for explanatory purposes. In practice, environment 200 may include additional devices, fewer devices, different devices, or differently arranged devices. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
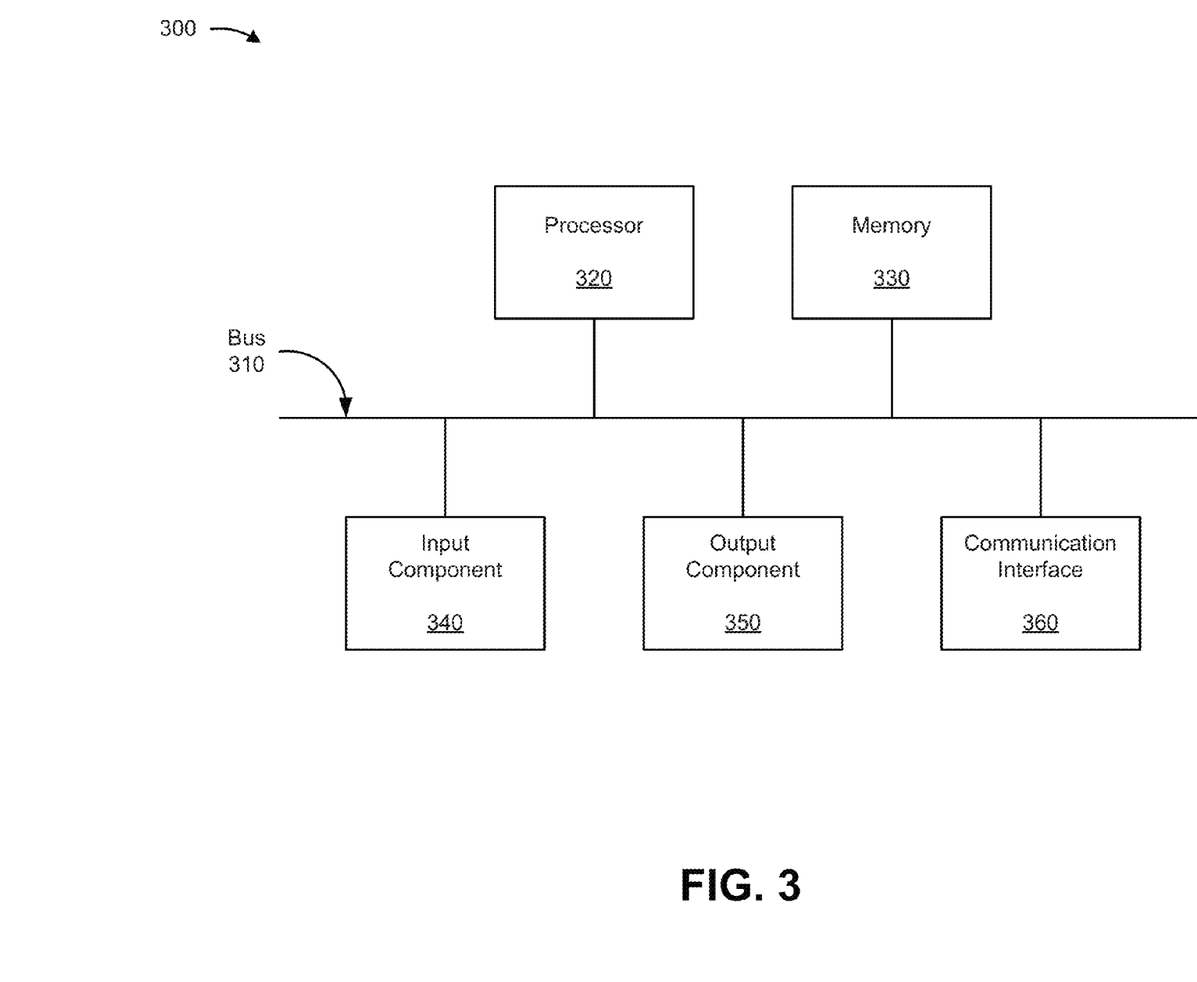
FIG. 3 is a diagram of example components of one or more devices of FIG. 2.

FIG. 3 is a diagram of example components of a device 300. Device 300 may correspond to user device 210, provisioning device 220, network device 230, and/or operator device 240. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210, provisioning device 220, network device 230, and/or operator device 240 may include one or more devices 300 and/or one or more components of device 300.

Figure 4:
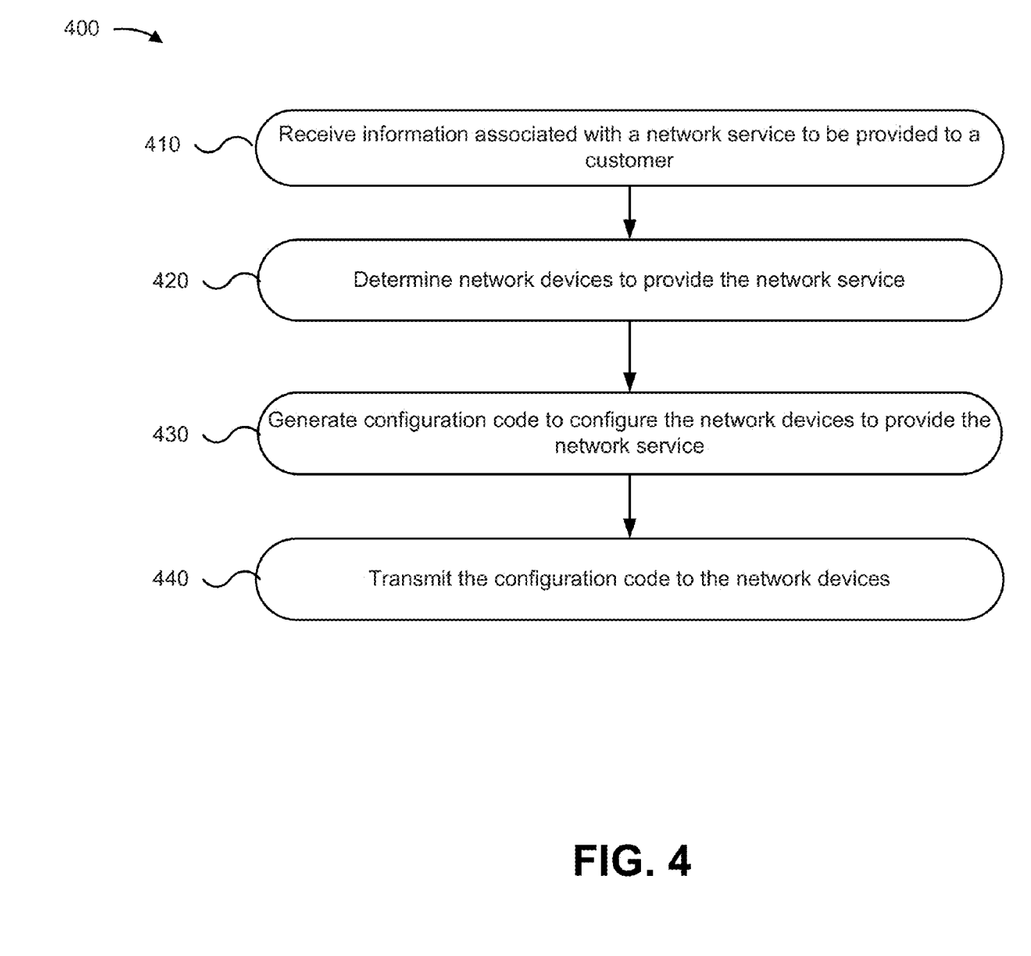
FIG. 4 is a flow chart of an example process for configuring network devices based on a network service to be provided to a customer.

FIG. 4 is a flow chart of an example process 400 for configuring network devices based on a network service to be provided to a customer. In some implementations, one or more process blocks of FIG. 4 may be performed by provisioning device 220. Additionally, or alternatively, one or more process blocks of FIG. 4 may be performed by another device or a group of devices separate from or including provisioning device 220, such as network device 230 and/or operator device 240.

As shown in FIG. 4, process 400 may include receiving information associated with a network service to be provided to a customer (block 410). For example, provisioning device 220 may receive (e.g., from a user and/or from another device, such as user device 210) information associated with the network service, such as network service information that identifies a type of network service (e.g., a voice communication service, a video service, a machine-to-machine communication service, etc.), a network device 230 and/or a type of network device 230 to provide the network service, requirements of the network service (e.g., bandwidth requirements, jitter requirements, packet delay requirements, security requirements, a quantity of users and/or user devices to be served by the network service, mobility of the user devices, traffic capacity requirements, etc.), an amount of money that the customer is willing to spend on the network service, a time period that the customer wants the network service, a geographic location associated with the network service (e.g., a particular region to be served by the network service, such as a residence, a business, a city, a state, a country, etc.), etc.

In some implementations, the network service information may be determined from a customer contract. For example, a user may input customer contract information via user device 210. Provisioning device 220 may receive the customer contract information, and may determine the network service information based on the customer contract information.

As further shown in FIG. 4, process 400 may include determining network devices to provide the network service (block 420). For example, provisioning device 220 may use the network service information to determine one or more network devices 230 to provide the network service. In some implementations, provisioning device 220 may receive information associated with network devices 230, such as information that identifies types of network devices 230 available in a service provider network (e.g., routers, gateways, servers, hubs, etc.), a quantity of network devices 230 (e.g., of each type) available in the service provider network, a capability of network devices 230 (e.g., bandwidth capabilities, jitter capabilities, packet delay capabilities, security capabilities, a quantity of users and/or user devices capable of being served by the network devices, traffic capacity capabilities, etc.), a geographic location of network devices 230, availability of network devices 230 (e.g., availability for provisioning), etc. Provisioning device 220 may receive the information associated with network devices 230 from network devices 230 and/or from another device (e.g., a device that includes a data structure that stores information associated with network devices 230).

Provisioning device 220 may use the network service information and the information associated with network devices 230 to identify network devices 230 to provide the network service. For example, provisioning device 220 may select one or more network devices 230 to provide the network service based on the type of network devices 230 capable of providing the network service (e.g., based on a location of network devices 230 and a location where the network service is to be provided, based on a capability of network devices 230 and a capability required by the network service, etc.).

In some implementations, a service provider may define one or more network service templates that identify network devices 230 that may provide the network service. Provisioning device 220 may retrieve a network service template based on the received network service information. Additionally, or alternatively, provisioning device 220 may modify the network service template based on the received network service information. For example, the network service template may identify types of network devices 230 required to provide the network service, and provisioning device 220 may determine the required quantity of each type of network device 230, the geographic locations of network devices 230, etc. A network service template may include one or more variables that may be required to be defined to determine network devices 230 to provide the network service.

In some implementations, provisioning device 220 may determine multiple combinations of network devices 230 that may provide the network service. Provisioning device 220 may select a particular combination of network devices 230 based on the received network service information. Additionally, or alternatively, provisioning device 220 may provide information regarding the multiple combinations of network devices 230 to user device 210 and/or operator device 240, and may receive an indication, from a user of user device 210 and/or operator device 240, of a particular combination of network devices 230 to provide the network service. In some implementations, different combinations of network devices 230 may be associated with different prices and/or costs.

As shown in FIG. 4, process 400 may include generating configuration code to configure the network devices to provide the network service (block 430). For example, provisioning device 220 may determine the network devices 230 required to provide the network service, and may generate configuration code that configures those network devices 230 to provide the network service. The configuration code may include, for example, programming code. Provisioning device 220 may generate the configuration code based on the type of network device 230 to be configured. For example, different network devices 230 may operate using different programming codes. Provisioning device 220 may determine the programming code language used to program a particular network device 230 (e.g., by receiving information from the particular network device 230 and/or another device, by retrieving the information from a data structure accessible by provisioning device 230, etc.), and may generate the configuration code for the particular network device 230 using the determined programming code language. In some implementations, the configuration code may include an application programming interface that provides access (e.g., via provisioning device 220 and/or user device 210) to change the configuration of network devices 230.

As further shown in FIG. 4, process 400 may include transmitting the configuration code to the network devices (block 440). For example, provisioning device 220 may transmit, to a network device 230 required to provide the network service, the configuration code that corresponds to that network device 230. Provisioning device 220 may transmit the configuration code, for example, via simple network management protocol (SNMP), telnet, secure shell (SSH), extensible markup language (XML), command line interface (CLI), and/or another protocol. The transmitted configuration code may configure network devices 230 to provide the network service, and may provision (e.g., make available for use) network devices 230 for the network service. In some implementations, the configuration code may ensure that traffic transmitted as part of the network service is isolated from other traffic. For example, the configuration code may create a virtual private network (VPN) for the customer.

In some implementations, provisioning device 220 may provide the configuration code to operator device 240, and may receive user approval (e.g., from operator device 240) and/or user modifications to the configuration code. Provisioning device 220 may provide the approved and/or modified configuration code to network devices 230. In some implementations, provisioning device 220 may transmit the configuration code to operator device 240 and/or network devices 230 at a particular time, based on a time identified by the received network service information (e.g., a time period that the customer desires to have the network service available).

Additionally, or alternatively, once network devices 230 have been provisioned (e.g., via the configuration code), provisioning device 220 may monitor network devices 230, and may provide monitoring information to user device 210 and/or operator device 240, and/or may store the monitoring information (e.g., in a report log). For example, provisioning device 220 may determine that network devices 230 have exceeded a traffic capacity threshold (e.g., based on a customer contract and/or the received network service information). Provisioning device 220 may transmit a notification (e.g., to user device 210, operator device 240, and/or another device) based on the traffic capacity threshold being exceeded, and/or may store the notification (e.g., in a report log).

While a series of blocks has been described with regard to FIG. 4, the blocks and/or the order of the blocks may be modified in some implementations. Additionally, or alternatively, non-dependent blocks may be performed in parallel.

Figure 5A:
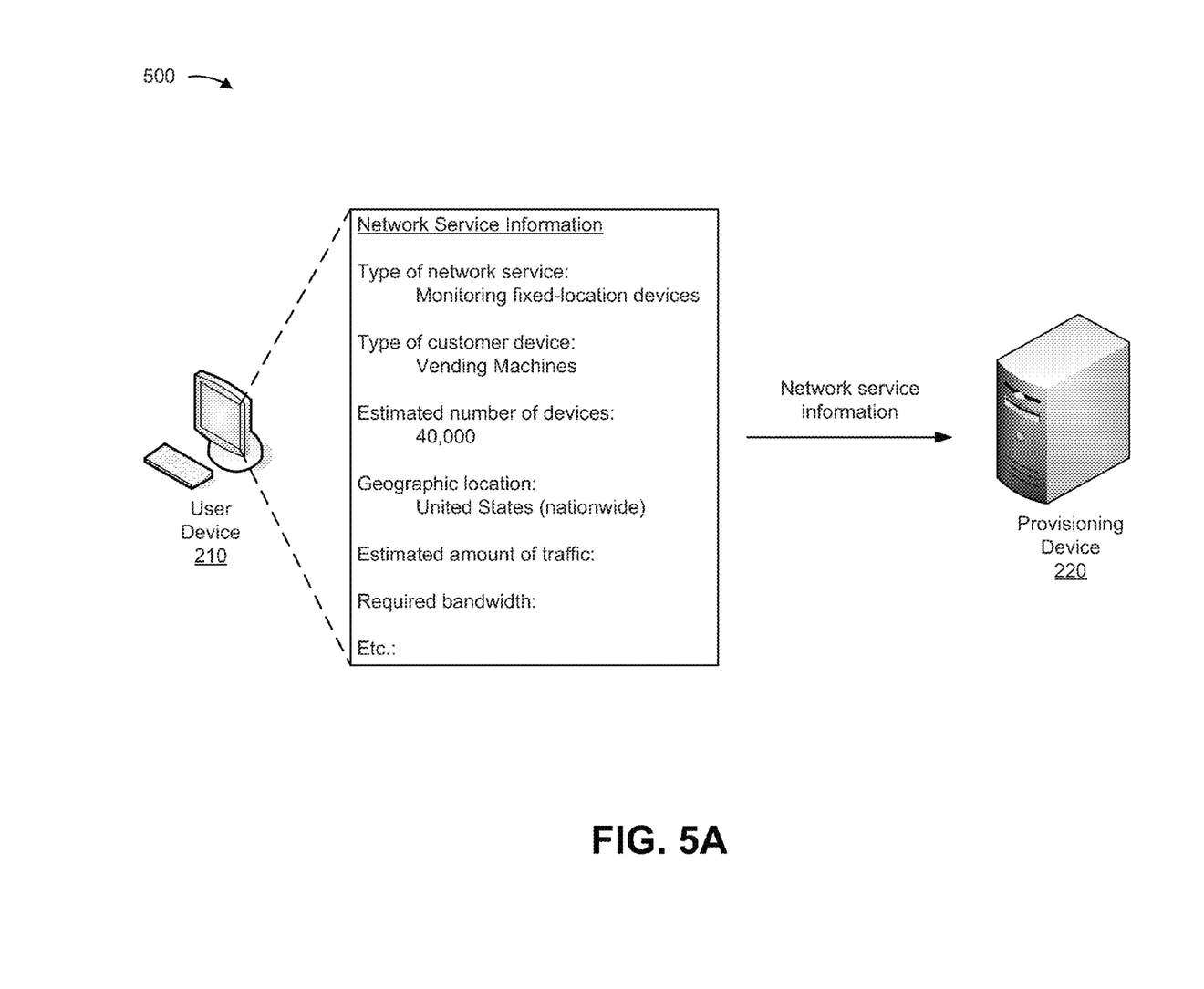
FIG. 5A is a diagram of an example implementation relating to the example process shown in FIG. 4, where network service information is received by a provisioning device.
Figure 5B:
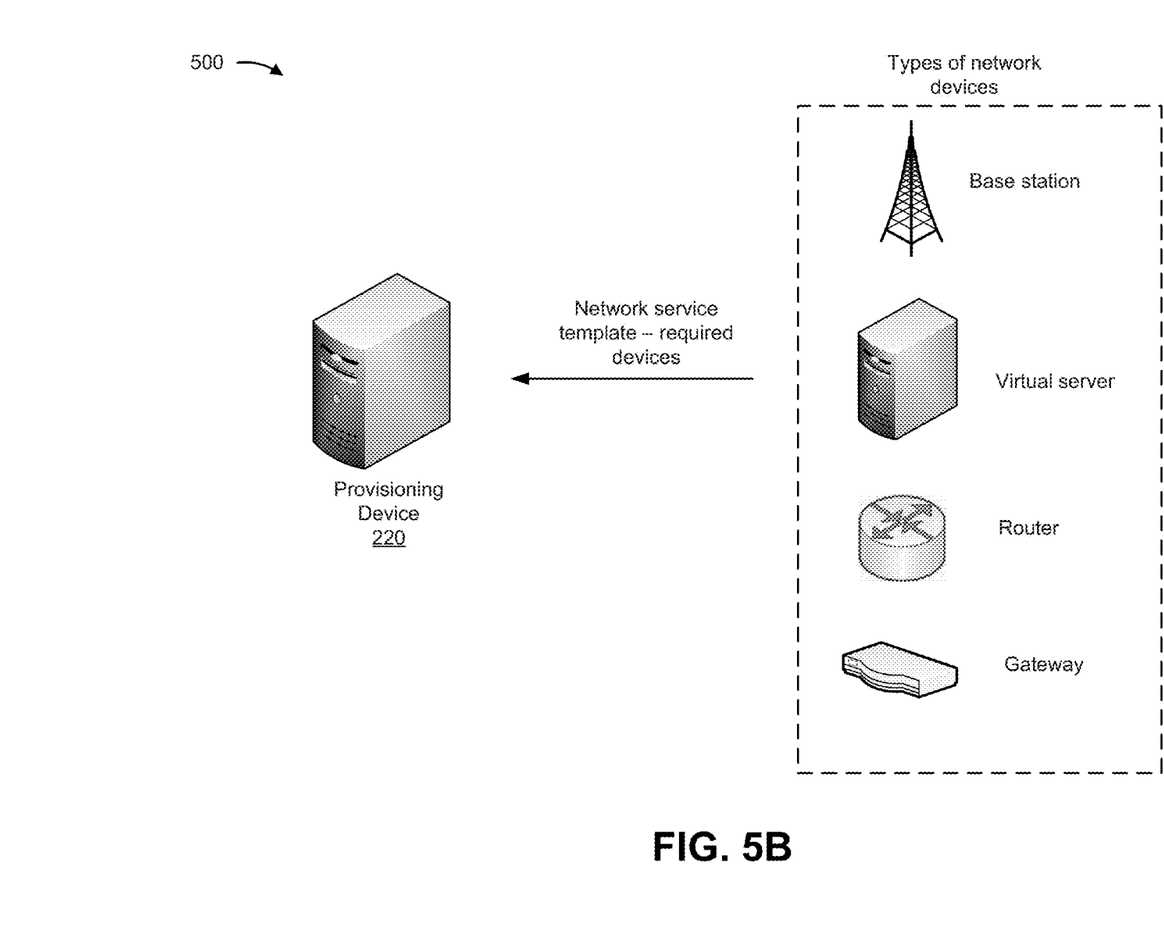
FIG. 5B is a diagram of an example implementation relating to the example process shown in FIG. 4, where the provisioning device receives a network service template based on the network service information.
Figure 5C:
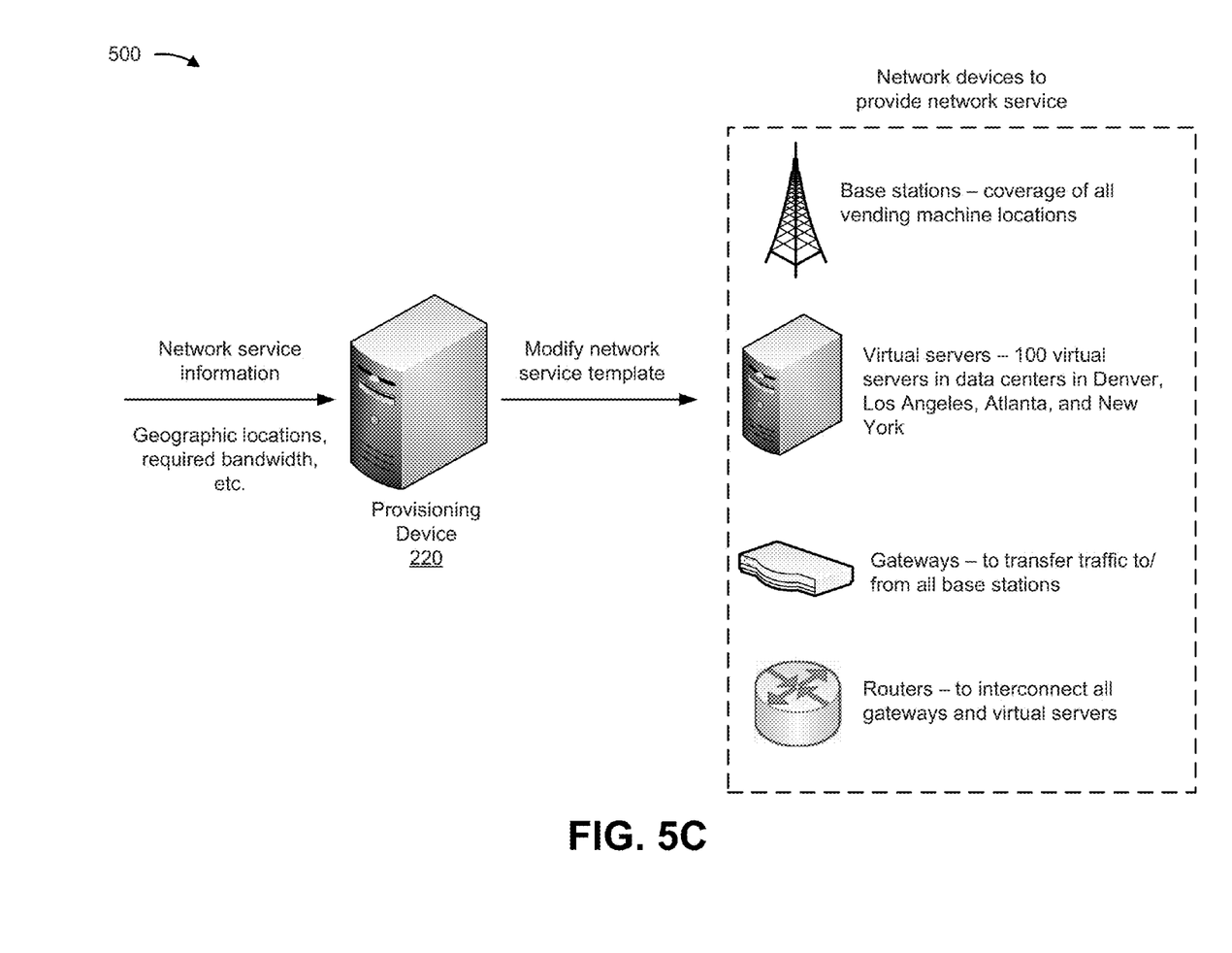
FIG. 5C is a diagram of an example implementation relating to the example process shown in FIG. 4, where the provisioning device modifies the network service template based on the network service information.
Figure 5D:
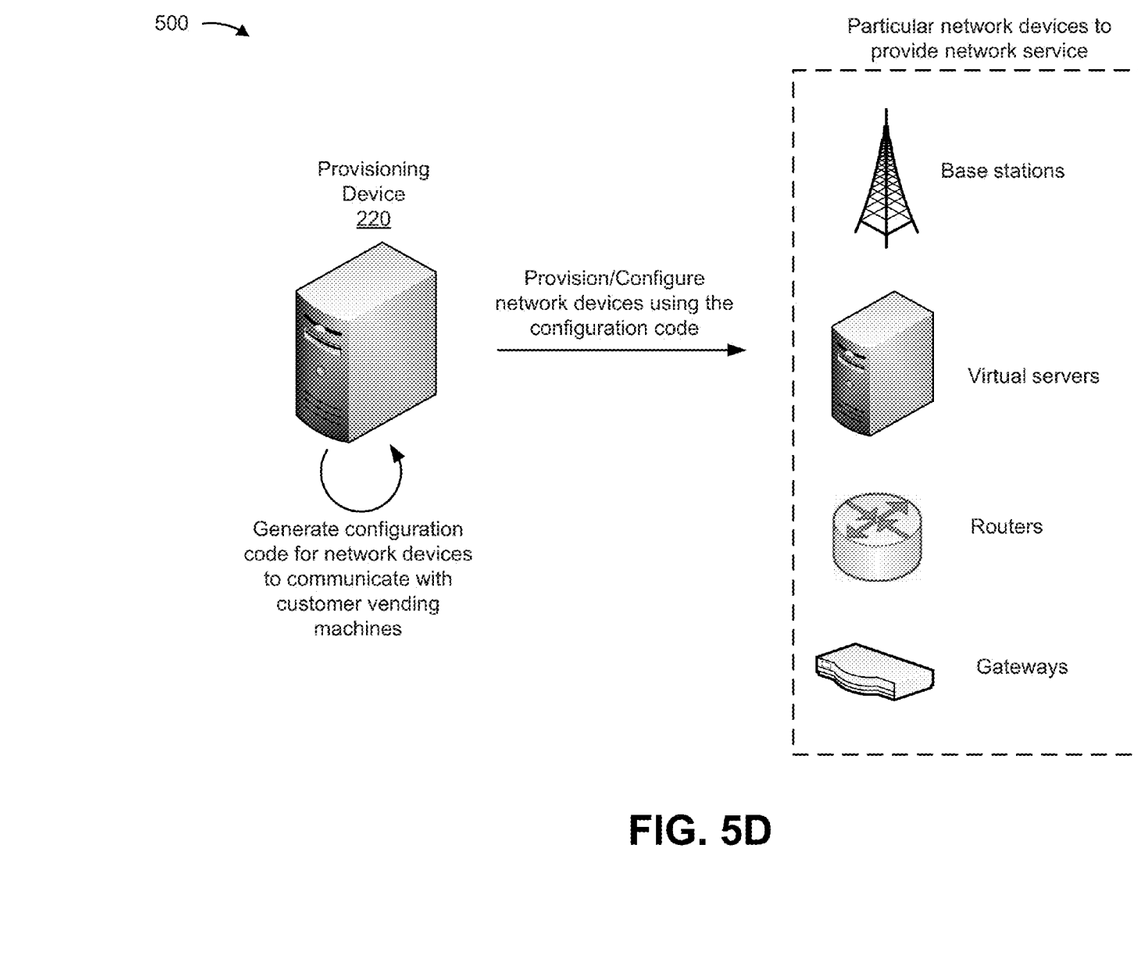
FIG. 5D is a diagram of an example implementation relating to the example process shown in FIG. 4, where the provisioning device generates configuration code and transmits the configuration code to network devices.

FIGS. 5A-5D are diagrams of an example implementation 500 relating to process 400 shown in FIG. 4. FIG. 5A depicts an example implementation where network service information is received by provisioning device 220. FIG. 5B depicts an example implementation where provisioning device 220 receives a network service template based on the network service information. FIG. 5C depicts an example implementation where provisioning device 220 modifies the network service template based on the network service information. FIG. 5D depicts an example implementation where provisioning device 220 generates configuration code and transmits the configuration code to network devices 230.

As shown in FIG. 5A, a customer may input (e.g., using user device 210), information associated with a network service to be provided to the customer. For example, the customer may input a type of network service to be provided, a type of customer device to be served by the network service, a quantity of customer devices to be served by the network service, a geographic location of the customer device(s), an estimated amount of traffic, a required bandwidth, and/or other information associated with the requested network service. For example, as shown, the customer may input "monitoring fixed-location devices" as the type of network service to be provided, "vending machines" as the customer devices to be supported by the network service, "40,000" as the quantity of vending machines to be supported, and "United States (nationwide)" as the geographic location of the vending machines. The input information may be received by user device 210, which may transmit the information to provisioning device 220 (e.g., based on user input, such as clicking a submit button).

As shown in FIG. 5B, provisioning device 220 may use the received network service information to retrieve a network service template associated with the network service to determine network devices 230 required to provide the requested network service. For example, provisioning device 220 may retrieve a network service template associated with monitoring fixed-location devices. The network service template may identify types of network devices 230 required to provide the network service. For example, the network service template may indicate that one or more base stations, virtual servers, routers, and gateways are required to provide the network service type of monitoring fixed-location devices.

As shown in FIG. 5C, provisioning device 220 may modify the network service template based on the received network service information. For example, provisioning device 220 may receive network service information that identifies geographic locations of the vending machines, required bandwidth to transfer traffic to/from the vending machines, the quantity of vending machines, etc. Provisioning device 220 may modify the network service template to identify the particular network devices 230 required to provide the network service. For example, provisioning device 220 may determine that the network service requires base stations that cover all of the vending machine locations, one hundred virtual servers located in data centers in Denver, Los Angeles, Atlanta, and New York, gateways to transfer traffic to/from all of the base stations, and routers to interconnect all of the gateways and virtual servers. Provisioning device 220 may determine the particular base stations, virtual servers, gateways, and routers that satisfy these requirements.

As another example, provisioning device 220 may receive information identifying the network service as a regional service to be provided, for example, only in the state of Washington. In this example, provisioning device 220 may provision network devices 230 located in the state of Washington.

Additionally, or alternatively, provisioning device 220 may determine a quantity of network devices 230 required to transfer traffic from customer devices (e.g., vending machines, parking meters, mobile devices, or any other communication device) to a customer's home network. Provisioning device 220 may determine the network devices and/or the quantity of network devices 230 based on received network service information, which may identify a bandwidth or capacity requirement and/or capability, an estimated amount of traffic to be generated and/or received by the customer devices, a distance between the customer devices, a quantity of customer devices to be served by the network service, whether the customer devices are fixed or mobile, etc.

As shown in FIG. 5D, provisioning device 220 may generate configuration code that configures network devices 230 to communicate with, gather information from, compile information from, and/or analyze information from the customer vending machines. Provisioning device 220 may transmit the configuration code to network devices 230, which may provision and/or configure network devices 230 to communicate with the customer vending machines.

Figure 6:
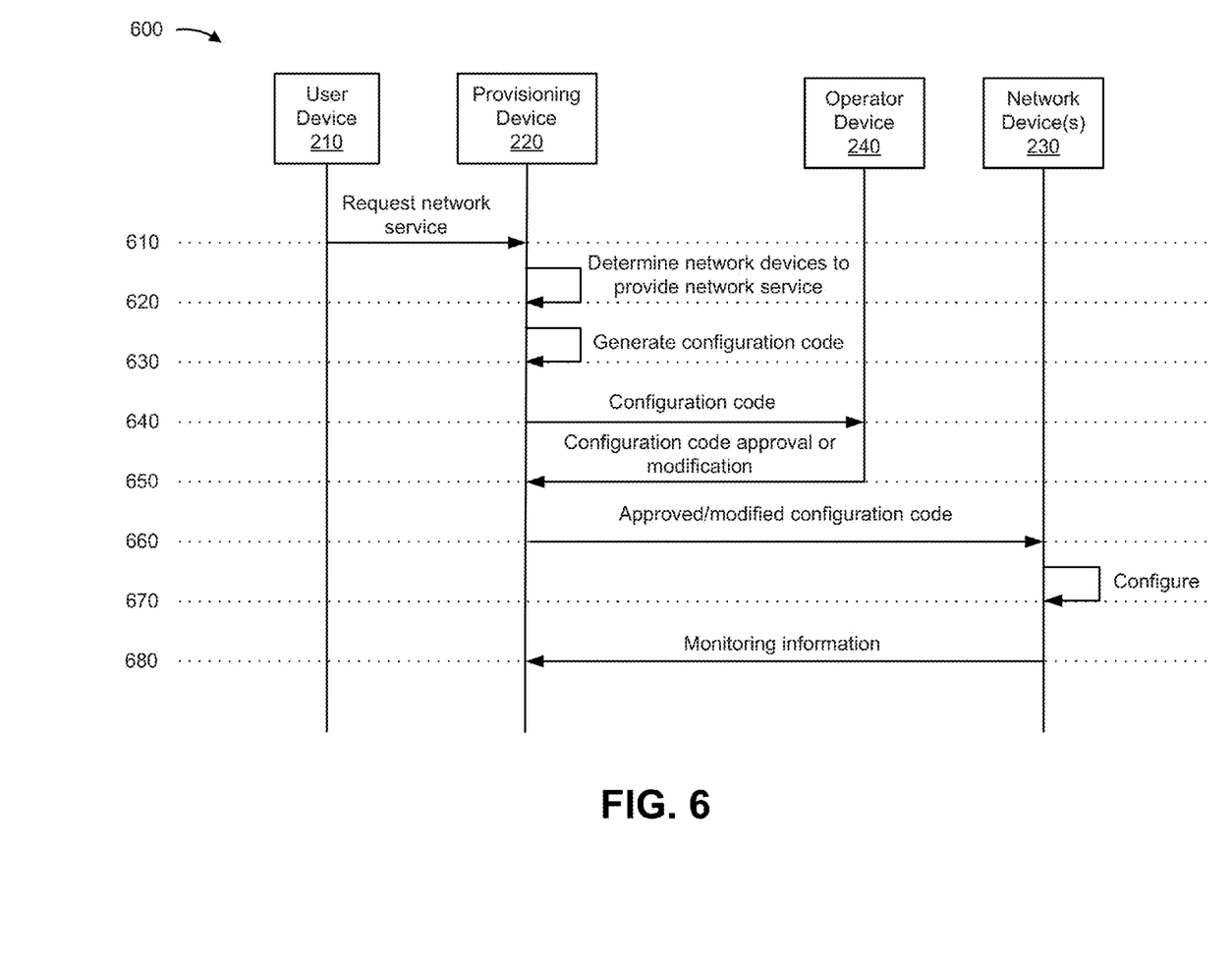
FIG. 6 is a diagram of an example call flow for provisioning network devices to provide a network service requested by a customer.

FIG. 6 is a diagram of an example call flow 600 for provisioning network devices to provide a network service requested by a customer.

As shown by reference number 610, call flow 600 may include transmitting, by user device 210 and to provisioning device 220, a request for a network service to be provided to a customer. As shown by reference number 620, call flow 800 may include determining, by provisioning device 220, network devices 230 to provide the requested network service. In some implementations, provisioning device 220 may receive information from network devices 230, operator device 240, and/or another device in order to determine network devices 230 to provide the requested network service.

As shown by reference number 630, call flow 600 may include generating, by provisioning device 220, configuration code to configure network devices 230 to provide the requested network service. As shown by reference number 640, call flow 600 may include transmitting, by provisioning device 220 and to operator device 240, the generated configuration code. As shown by reference number 650, call flow 600 may include transmitting, by operator device 240 and to provisioning device 220, an indication of approval of the configuration code and/or a modification to the configuration code. For example, a user of operator device 240 may provide input to operator device 240 to modify and/or approve the configuration code.

As shown by reference number 660, call flow 600 may include transmitting, by provisioning device 220 and to network devices 230, the approved and/or modified configuration code. As shown by reference number 670, call flow 600 may include configuring, using the approved and/or modified configuration code, network devices 230. As shown by reference number 680, call flow 600 may include transmitting, by network devices 230 and to provisioning device 220, monitoring information, such as utilized capacity of network devices 230, diagnostic information associated with network devices 230, operating status of network devices 230, etc. In some implementations, network devices 230 may transmit the monitoring information to user device 210 and/or operator device 240. Additionally, or alternatively, provisioning device 220 may receive the monitoring information from network devices 230, and may transmit the monitoring information to user device 210 and/or operator device 240.

Implementations described herein may provide automatic configuration of network devices to provide network services requested by a customer.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive network service information that identifies a type of network service to be provided in association with one or more customer devices;
   determine, based on the type of network service, a plurality of network devices to be provisioned to communicate with the one or more customer devices to provide the network service,
      the plurality of network devices including a first network device and a second network device;
   generate, for the plurality of network devices, configuration code for provisioning the plurality of network devices to communicate with the one or more customer devices to provide the network service,
      the configuration code including first configuration code corresponding to the first network device and second configuration code corresponding to the second network device,
         the first configuration code being different from the second configuration code;
   transmit, to the first network device, the first configuration code,
      the first configuration code provisioning the first network device to communicate with the one or more customer devices to provide the network service; and
   transmit, to the second network device, the second configuration code,
      the second configuration code provisioning the second network device to communicate with the one or more customer devices to provide the network service.

2. The device of claim 1, where the one or more processors, when determining the plurality of network devices, are further to:
   identify, based on the network service information, a network service template that identifies a plurality of types of network devices to be provisioned to communicate with the one or more customer devices to provide the network service; and
   determine the plurality of network devices based on the plurality of types of network devices and at least one of:
      a geographic location, identified by the network service information, associated with the network service; or
      a quantity of customer devices, identified by the network service information, to be served by the network service.

3. The device of claim 1, where the first configuration code includes first programming code in a first programming language associated with the first network device; and
   where the second configuration code includes second programming code in a second programming language associated with the second network device,
      the second programming code being different from the first programming code, and
      the second programming language being different from the first programming language.

4. The device of claim 1, where the type of network service includes at least one of:
   a voice communication service;
   a video service; or
   a machine-to-machine communication service.

5. The device of claim 1, where the one or more processors are further to:
   monitor a utilized capacity of at least one of the plurality of network devices;
   determine that the utilized capacity satisfies a threshold identified by the network service information;
   transmit, to a user device, a notification that the utilized capacity satisfies the threshold.

6. The device of claim 1, where the one or more processors are further to:
   transmit the first configuration code to a user device;
   receive, from the user device, at least one of:
      an approval of the first configuration code, or
      a modification to the first configuration code to form modified configuration code; and
   where the one or more processors, when transmitting the first configuration code, are further to:
      transmit, to the first network device, at least one of:
         the first configuration code based on receiving the approval of the first configuration code, or
         the modified configuration code based on receiving the modification to the first configuration code.

7. The device of claim 1, where the plurality of network devices are included in a multiprotocol label switching network.

8. A non-transitory computer-readable medium storing instructions, the instructions comprising:
   one or more instructions that, when executed by one or more processors, cause the one or more processors to:
      receive network service information that identifies a type of network service to be provided to a customer device;

identify, based on the type of network service, a plurality of network devices to be configured to communicate with the customer device to provide the network service,
the plurality of network devices including a first network device and a second network device,
the first network device being a different type of device than the second network device;
generate first configuration code for configuring the first network device to communicate with the customer device to provide the network service;
generate second configuration code for configuring the second network device to communicate with the customer device to provide the network service,
the first configuration code being different from the second configuration code;
transmit, to the first network device, the first configuration code,
the first configuration code configuring the first network device to communicate with the customer device to provide the network service; and
transmit, to the second network device, the second configuration code,
the second configuration code configuring the second network device to communicate with the customer device to provide the network service.

9. The non-transitory computer-readable medium of claim 8, where the one or more instructions, that cause the one or more processors to identify the plurality of network devices, further cause the one or more processors to:
identify, based on the network service information, a network service template that identifies a plurality of types of network devices to be configured to communicate with the customer device to provide the network service;
determine, based on the network service information, a geographic location associated with the network service; and
identify the plurality of network devices based on the plurality of types of network devices and the geographic location.

10. The non-transitory computer-readable medium of claim 8, where the first configuration code causes the first network device to:
gather information associated with the customer device; and
analyze the information.

11. The non-transitory computer-readable medium of claim 8, where the one or more instructions, when executed by the one or more processors, further cause the one or more processors to:
monitor a utilized capacity of at least one of the plurality of network devices;
determine that the utilized capacity satisfies a threshold identified by the network service information;
transmit, to a user device, a notification that the utilized capacity satisfies the threshold.

12. The non-transitory computer-readable medium of claim 8, where the one or more instructions, when executed by the one or more processors, cause the one or more processors to:
transmit the first configuration code to a user device;
receive, from the user device, at least one of:
an approval of the first configuration code, or
a modification to the first configuration code to form modified configuration code; and where the one or more instructions, that cause the one or more processors to transmit the first configuration code, further cause the one or more processors to:
transmit, to the first network device, at least one of:
the first configuration code based on receiving the approval of the first configuration code, or
the modified configuration code based on receiving the modification to the first configuration code.

13. The non-transitory computer-readable medium of claim 8, where the plurality of network devices include a plurality of traffic transfer devices.

14. The non-transitory computer-readable medium of claim 8, where the one or more instructions, that cause the one or more processors to identify the plurality of network devices, further cause the one or more processors to:
identify, based on the network service information, a type of the customer device; and
identify the plurality of network devices based on the type of the customer device.

15. A method, comprising:
receiving, by a device, network service information that identifies a network service to be provided for a customer device;
determining, by the device and based on the network service, a plurality of network devices to be provisioned to communicate with the customer device;
generating, by the device, configuration code for provisioning the plurality of network devices to communicate with the customer device,
the configuration code including first configuration code, corresponding to a first network device of the plurality of network devices, and second configuration code corresponding to a second network device of the plurality of network devices,
the first configuration code being different from the second configuration code;
transmitting, by the device and to the first network device, the first configuration code,
the first configuration code provisioning the first network device to communicate with the customer device; and
transmitting, by the device and to the second network device, the second configuration code,
the second configuration code provisioning the second network device to communicate with the customer device.

16. The method of claim 15, where determining the plurality of network devices further comprises:
identifying, based on the network service information, a network service template that identifies a plurality of types of network devices to be provisioned to communicate with the customer device;
determining, based on the network service information, a quantity of customer devices to be served by the network service; and
determining the plurality of network devices based on the plurality of types of network devices and the quantity of customer devices.

17. The method of claim 15, further comprising:
monitoring a utilized capacity of at least one of the plurality of network devices;
determining that the utilized capacity satisfies a threshold identified by the network service information;
transmitting, to a user device, a notification that the utilized capacity satisfies the threshold.

18. The method of claim 15, further comprising:
transmitting the first configuration code to a user device;

receiving, from the user device, at least one of:
   an approval of the first configuration code, or
   a modification to the first configuration code to form modified configuration code; and
where transmitting the first configuration code further comprises:
   transmitting, to the first network device, at least one of:
      the first configuration code based on receiving the approval of the first configuration code, or
      the modified configuration code based on receiving the modification to the first configuration code.

19. The method of claim 15, where the plurality of network devices include at least one of:
   a router;
   a gateway;
   a switch; or
   a base station.

20. The method of claim 15, where determining the plurality of network devices further comprises:
   identifying, based on the network service information, a network service template that identifies a plurality of types of network devices to be provisioned to communicate with the customer device;
   determining a quantity of network devices to be provisioned to communicate with the customer device; and
   determining the plurality of network devices based on the plurality of types of network devices and the quantity of network devices.

* * * * *